(No Model.)
J. L. HANSON.
WHISTLE.
No. 604,918. Patented May 31, 1898.
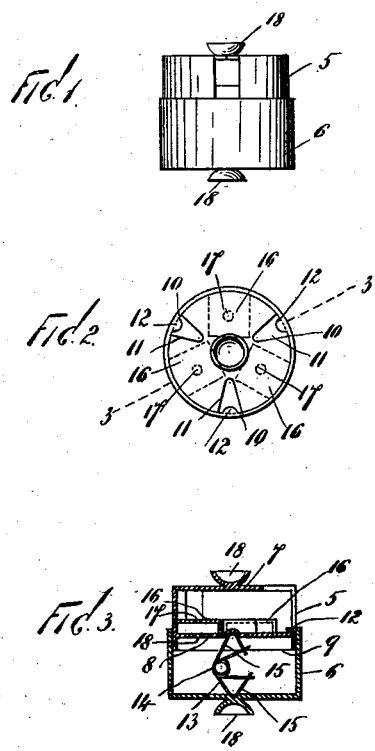
WITNESSES:
INVENTOR
ATTORNEYS.

UNITED STATES PATENT OFFICE.

JULIUS L. HANSON, OF GOVERNOR'S ISLAND, NEW YORK.

WHISTLE.

SPECIFICATION forming part of Letters Patent No. 604,918, dated May 31, 1898.

Application filed October 7, 1897. Serial No. 654,323. (No model.)

*To all whom it may concern:*

Be it known that I, JULIUS L. HANSON, a citizen of the United States, residing at Governor's Island, in the county of New York and State of New York, have invented certain new and useful Improvements in Whistles, of which the following is a full and complete specification, such as will enable those skilled in the art to which it appertains to make and use the same.

This invention relates to toy whistles; and the object thereof is to provide an improved device of this class which is simple in construction and operation and comparatively inexpensive and which is intended to amuse the young and to be used wherever whistles of this class are required.

The invention is fully disclosed in the following specification, of which the accompanying drawings form a part, in which—

Figure 1 is a side view of my improved whistle; Fig. 2, a plan view thereof, and Fig. 3 a cross-section on the line 3 3 of Fig. 2.

In the drawings forming part of this specification the separate parts of my improvement are designated by the same numerals of reference in each of the views, and in the practice of my invention I provide a whistle of the class herein specified which consists of two cylindrical telescopic casings 5 and 6 and other details of construction, which I will now proceed to describe.

The upper casing 5 is adapted to slide in the lower casing 6, and the lower casing 6 is closed at the bottom and open at the top, and the upper casing 5 is provided with a top 7 and a bottom 8, and below the bottom 8 said upper casing is provided with a downwardly-directed flange or rim 9.

The upper casing 5 is provided in the sides thereof with a plurality of vertical slots or openings 10, which, as shown in the drawings, are three in number, and the top 7 thereof is provided with corresponding radial and triangular notches or recesses 11, and the bottom casing 6 is provided with inwardly-directed lugs or projections 12 at the top thereof, which project into the slots or openings 10 and overlap the bottom 8 of the upper casing 5, so as to prevent the separation of said casings.

Mounted centrally of the bottom casing 6 is a spring 13, which comprises a central coil 14 and spring-arms 15, and the spring-arms 15 have bearings in the bottom of the casing 6 and in the bottom of the casing 5, and said spring is held in position by said bearings, and the object of the spring 13 is to normally hold the casings 5 and 6 in the position shown in Fig. 3, and said casings may be telescoped or the casing 5 forced into the casing 6 against the operation of said spring by pressure applied to the top of the casing 5 and the bottom of the casing 6. I also place in the casing 5 air-chambers 16, three of which are shown, and each of which is provided in the top thereof with a perforation 17, and the bottom of the casing 5 is provided with corresponding perforations 18, and when the casing 5 is forced into the casing 6 the air from the casing 6 will be forced through said perforations in the bottom 8 of the casing 5, through the air-chambers 16, and through the perforations 17 in the top thereof and out through the slots or openings in the sides of the casing 5, and this operation will produce a short sharp sound or whistle.

The air-casings 16 are shown in dotted lines in Fig. 2 and in full lines in Fig. 3 and are preferably arranged radially and s ured to the bottom of the casing 5 or forme thereon.

The construction of the sprin 3 is such that the force required to teles e the casings or force the casing 5 in t casing 6 is much less at the last than at e beginning of said movement, and it will be understood that as the pressure is remov d from the casing 5 the spring 13 will force it outwardly again, and this operation may be repeated as often as desired.

I also prefer to place on the top of the casing 5 and on the bottor of the casing 6 thumb or finger cups or pieces 18, against or in which the thumb and fing are placed in the operation of the device; but these features are not essential and may or may not be employed.

My improvement is simple in construction and operation and is also comparatively inexpensive, and it will be apparent that changes in and modifications of the construction herein described may be made without departing from the spirit of my invention or sacrificing its advantages.

Having fully described my invention, I claim as new and desire to secure by Letters Patent—

1. A whistle comprising a bottom casing, a top casing arranged therein and adapted to telescope therewith, means to prevent the separation of said casings, the said top casing being provided with slots or openings in the sides thereof, air-chambers arranged upon said top casing, and provided with openings communicating with the interior of the bottom casing and the top casing, and a spring arranged in the bottom casing for forcing the top casing upwardly, substantially as described.

2. A whistle comprising a bottom casing provided upon its upper edge with inwardly-projecting lugs, a top casing arranged within said bottom casing and adapted to telescope therewith, the said top casing being provided with slots or openings in its sides within which the lugs of the lower casing are guided, air-chambers arranged upon said top casing and provided with openings communicating with the interior of the bottom casing and with the top casing, and a spring arranged in the bottom casing for forcing the top casing upwardly, substantially as described.

In testimony that I claim the foregoing as my invention I have signed my name, in presence of the subscribing witnesses, this 5th day of October, 1897.

JULIUS L. HANSON.

Witnesses:
C. GERST,
S. L. HAWKSHURST.